United States Patent [19]

Peehs et al.

[11] 4,318,492
[45] Mar. 9, 1982

[54] FUEL ASSEMBLY STORAGE CAPSULE FOR STORING SPENT FUEL ASSEMBLIES

[75] Inventors: Martin Peehs, Bubenreuth; Werner Petri, Erlangen, both of Fed. Rep. of Germany

[73] Assignee: Kraftwerk Union Aktiengesellschaft, Mülheim, Fed. Rep. of Germany

[21] Appl. No.: 148,273

[22] Filed: May 9, 1980

[30] Foreign Application Priority Data

May 16, 1979 [DE] Fed. Rep. of Germany ....... 2919797

[51] Int. Cl.³ .............................................. B65D 53/06
[52] U.S. Cl. ..................................... 220/228; 220/352
[58] Field of Search ................... 220/352, 353, 3, 228, 220/205, 208, 366

[56] References Cited

U.S. PATENT DOCUMENTS 2,995,505 8/1961 Guild .............................. 220/228 X
3,522,144 7/1970 Webb et al. .................... 220/228 X
4,116,357 9/1978 Stanley, Jr. ..................... 220/228 X Primary Examiner—George T. Hall
Attorney, Agent, or Firm—Herbert L. Lerner; Laurence A. Greenberg

[57] ABSTRACT

Fuel assembly storage capsule for storing spent fuel assemblies in water-filled fuel pits, the capsule being formed of a sleeve sealed at the bottom thereof, having an upper opening closable by a cover and having a cross section matching that of a fuel assembly to be received therein, includes a rim formed on the cover and laterally embracing the sleeve in installed condition of the cover, the cover being retained on the sleeve of its own weight exclusively, the inner surface of the sleeve and the cover rim, in installed condition of the cover, under water, defining an annular space filled with air.

3 Claims, 3 Drawing Figures

FUEL ASSEMBLY STORAGE CAPSULE FOR STORING SPENT FUEL ASSEMBLIES

The invention relates to a fuel assembly storage capsule for storing spent fuel assemblies in water-filled fuel pits, the capsule being formed of a sleeve sealed at the bottom thereof and matching the fuel assembly to be received therein, the sleeve being an upper opening closable by a cover.

It is generally known that the fuel assemblies of nuclear reactors, after burn-up thereof, must be stored in special storage pits until they are reprocessed. Since such fuel assemblies had been installed in a nuclear reactor for several years, it is possible that impurities have been deposited on their surface i.e. on the surface of the individual fuel rods of which such a fuel assembly is composed, and such impurities can fall off, under certain circumstances, during further handling. Due to the extremely high radiation density within the reactor core, such impurities have usually also become radioactive. It is furthermore possible that the cladding or the end plugs of some fuel rods have become defective, so that fission products in water-soluble or gaseous form can escape therefrom upon further handling and storage.

If the fuel assemblies are stored unprotected in a storage pit, these phenomena can, in some cases, cause heavy contamination of the fuel pit and especially of the water contained therein, so that suitably large filtering systems must be provided for the pit water and, in addition, further decontamination work becomes necessary when cleaning the pit. Such contamination can become so heavy that additional shielding measures become necessary. To avoid such contamination of the storage pit, it has been proposed heretofore (note, for example, German Published, Non-Prosecuted Applications DE-OS 27 18 305 and DE-OS 27 43 453) to enclose the fuel assemblies in storage capsules which were either pressure-proof or are also equipped with pressure relief systems.

Such containers have a great disadvantage in that they are rather expensive to construct and that, especially, sealing problems can occur also at the flanges of the covers thereof.

It is accordingly an object of the invention to provide a fuel assembly storage capsule of considerably simpler construction which has no sealing problems of any kind and, furthermore, dispenses with any external pressure equalization means.

With the foregoing and other objects in view, there is provided a fuel assembly storage capsule for storing spent fuel assemblies in water-filled fuel pits, the capsule being formed of a sleeve sealed at the bottom thereof, having an upper opening closable by a cover and having a cross-section matching that of a fuel assembly to be received therein, comprising a rim formed on the cover and laterally embracing the sleeve, in installed condition of the cover, the cover being retained on the sleeve of its own weight exclusively and without any holding mechanism, the inner surface of the sleeve and the cover rim, in installed condition of the cover, under water, defining an annular space filled with air.

In accordance with another feature of the invention, the cover has a closed collecting vessel projecting into the sleeve, the collecting vessel being formed with lateral water-overflow openings which, in installed condition of the cover, are located below the adjacent upper rim of the sleeve.

In accordance with a concomitant feature of the invention, the cover has a displacement body sealed on all sides thereof and projecting into the sleeve, the cover being seated through the intermediary of spring-elastic spacers on the rim of the sleeve.

Other features which are considered as characteristic for the invention are set forth in the appended claims.

Although the invention is illustrated and described herein as embodied in fuel assembly storage capsule for storing spent fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
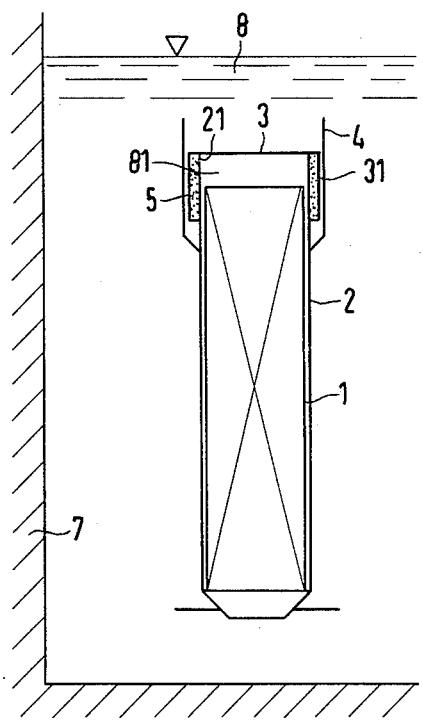
FIG. 1 is a diagrammatic longitudinal-sectional view of a first embodiment of the fuel assembly storage capsule according to the invention.

Referring now to the drawing and first, particularly, to FIG. 1 thereof, there is shown diagrammatically a longitudinal sectional view of a fuel assembly capsule 2 which is stored in a fuel pit filled with a volume 8 of water. The fuel assembly 1 which is to be stored is contained in the capsule 2 which is formed of a simple sleeve closed at the bottom, whereon a cover 3 with an overhanging rim 31 is placed. Two transporting straps 4 are represented diagrammatically and serve for handling the fuel assembly capsule 2. To insert such a capsule 2 into the fuel pit 7, the cover 3 is left off first, so that the interior becomes filled with water 81. Then the cover 3 is put on from above; the air cushion initially present in the capsule 2 is displaced and remains in the annular space 5 between the rim 31 of the cover 3 and the sleeve 2. Through this air cushion, the capsule water 81 is reliably separated ffrom the pit water 8, since the upper rim of the sleeve 21 is within the air cushion in the cover 3.

In this manner one can economize on a complicated closure mechanism, because the cover 3 virtually rests on the capsule by its own weight.

If the inserted fuel assembly 1 yet has a large decay heat which causes a considerable temperature increase of the water 81 in the storage capsule 2, this quantity of water will expand, so that there is a danger that contaminated water will escape into the pit 7 per se. This can be prevented, however, in a relatively simple manner by the embodiments of the invention shown in FIGS. 2 and 3.

Figure 2:
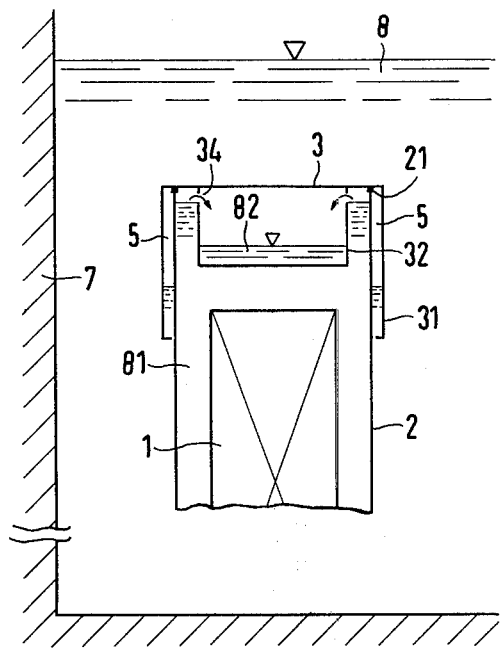
FIG. 2 is a fragmentary diagrammatic longitudinal-sectional view of a second embodiment of the invention.

According to FIG. 2, the cover 3 is provided with a collecting vessel 32 which is formed with lateral water-overflow holes 34 just below the plane of the cover 3 or the adjacent upper sleeve edge 21. If the water content 31 of the storage capsule 2 expands, water will flow through these overflow holes 34 into the interior of the collecting vessel 32 (note the indicated water level 82). It is no longer possible for the water to excape into the pit water 8, since the water 81 filling the capsule 2 no longer reaches the sleeve edge 21.

Figure 3:
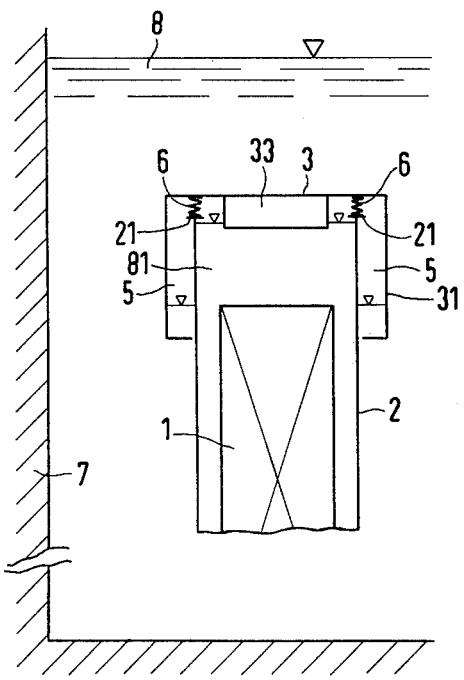
FIG. 3 is a view similar to FIG. 2 of a third embodiment of the invention.

FIG. 3 shows a further possibility for solving this problem. In FIG. 3, the cover 3 no longer rests on the edge of the sleeve 21 directly, but through elastic spacers 6. The cover 3 is, furthermore, provided with a displacement body 33 which is closed on all sides. The operation of this construction is as follows: as discussed in connection with FIG. 1, the capsule 2, open at the top thereof, together with the fuel assembly 1 is inserted into the storage pit 7. Then, the cover 3 is placed thereon. In the course of doing so, however, the elastic spacers 6 are compressed so that the displacement body 33 is immersed in the water volume 81 of the capsule 2 and displaces water, which is not yet contaminated at that time, over the edge 21 into the pit water 8. Thereafter, the pressure on the cover 33 is removed, and the resilient spacers 6 lift the cover 3 up somewhat so that the water level of the water 81 filling the capsule 2 sinks down from the sleeve edge 21 so that also a volume increase in this remaining volume 81 of water due to the fuel-assembly decay heat no longer permits the water level to rise up to the edge 21 and to run over into the pit water 8.

As is generally known from the state of the art, elements which increase the surface of the capsule 2 can also be employed here to allow improved heat transfer from the fuel assembly 1 into the pit water 8 and therefore keep the change in volume of the water 81 within the capsule 2 additionally within limits.

In conclusion, it should be mentioned that the cover 3 is, of course, not removed when this fuel assembly storage capsule 2 is taken out of the pit 7 at the end of the storage period, so that fission gases from defective fuel rods, which might have collected therein, cannot escape. It is noted, in this regard, that for this purpose the air cushion in the space 5 can be drawn off by suction with a simply inserted device before the storage capsule 2 is lifted out.

There are claimed:

1. Fuel assembly storage capsule for storing spent fuel assemblies in water-filled fuel pits, the capsule being formed of a sleeve sealed at the bottom thereof, having an upper opening closable by a cover and having a cross section matching that of a fuel assembly to be received therein, comprising a rim formed on the cover and laterally embracing the sleeve in installed condition of the cover, the cover being retained on the sleeve of its own weight exclusively, the inner surface of the sleeve and said cover rim, in installed condition of the cover, under water, defining an annular space filled with air.

2. Fuel assembly according to claim 1 wherein the cover additionally has a closed collecting vessel projecting into the sleeve, said collecting vessel being formed with lateral water-overflow openings which, in installed condition of the cover, are located below the adjacent upper rim of the sleeve.

3. Fuel assembly according to claim 1 wherein the cover additionally has a displacement body sealed on all sides thereof and projecting into the sleeve, the cover being seated through the intermediary of spring-elastic spacers on the rim of the sleeve.

* * * * *